June 11, 1935.    J. B. S. ANTELME    2,004,624
DEVICE FOR SETTING TUBULAR RIVETS
Filed May 11, 1933    4 Sheets-Sheet 1
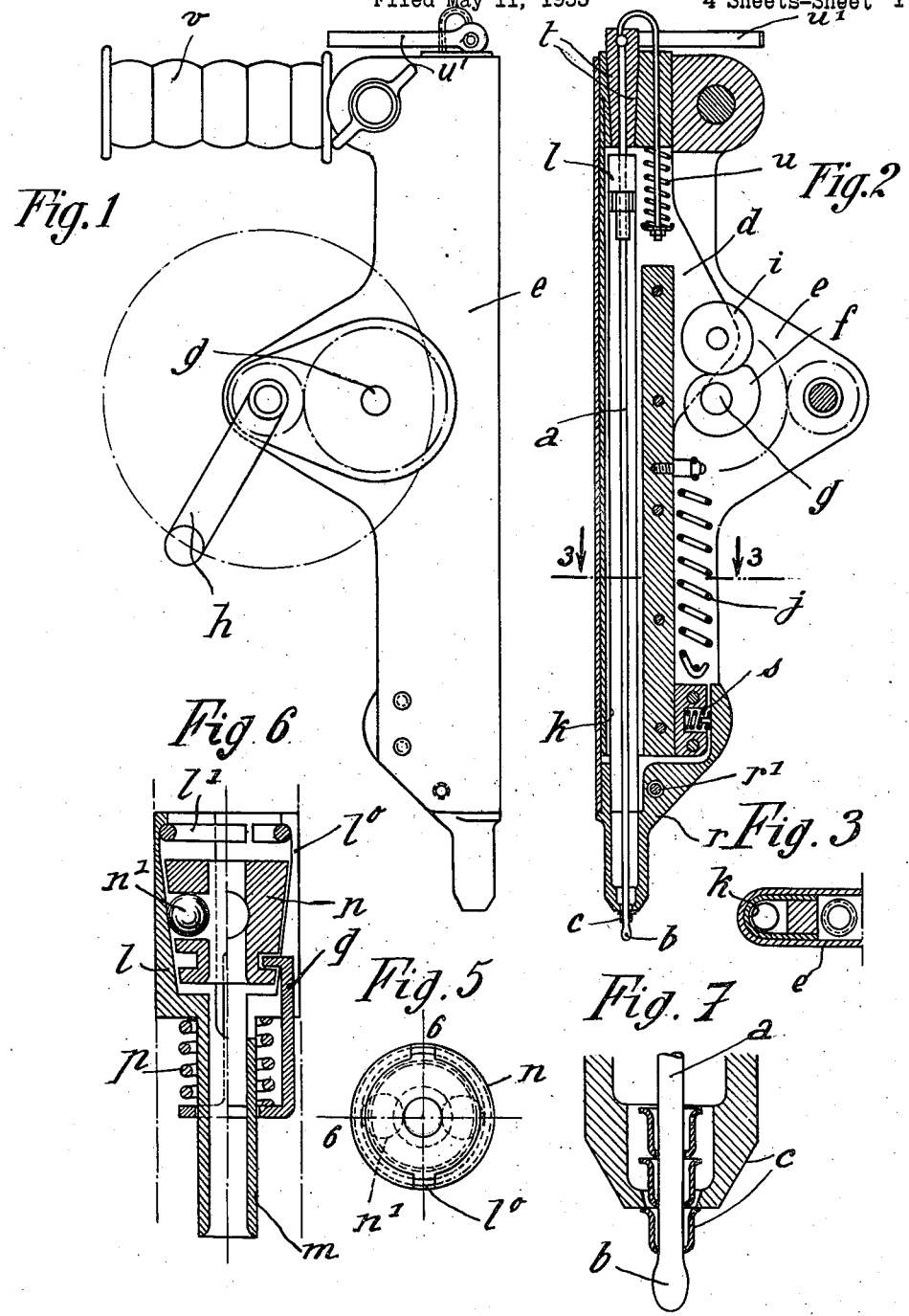
J. B. S. Antelme
INVENTOR
By: Marks & Clerk
ATTYS

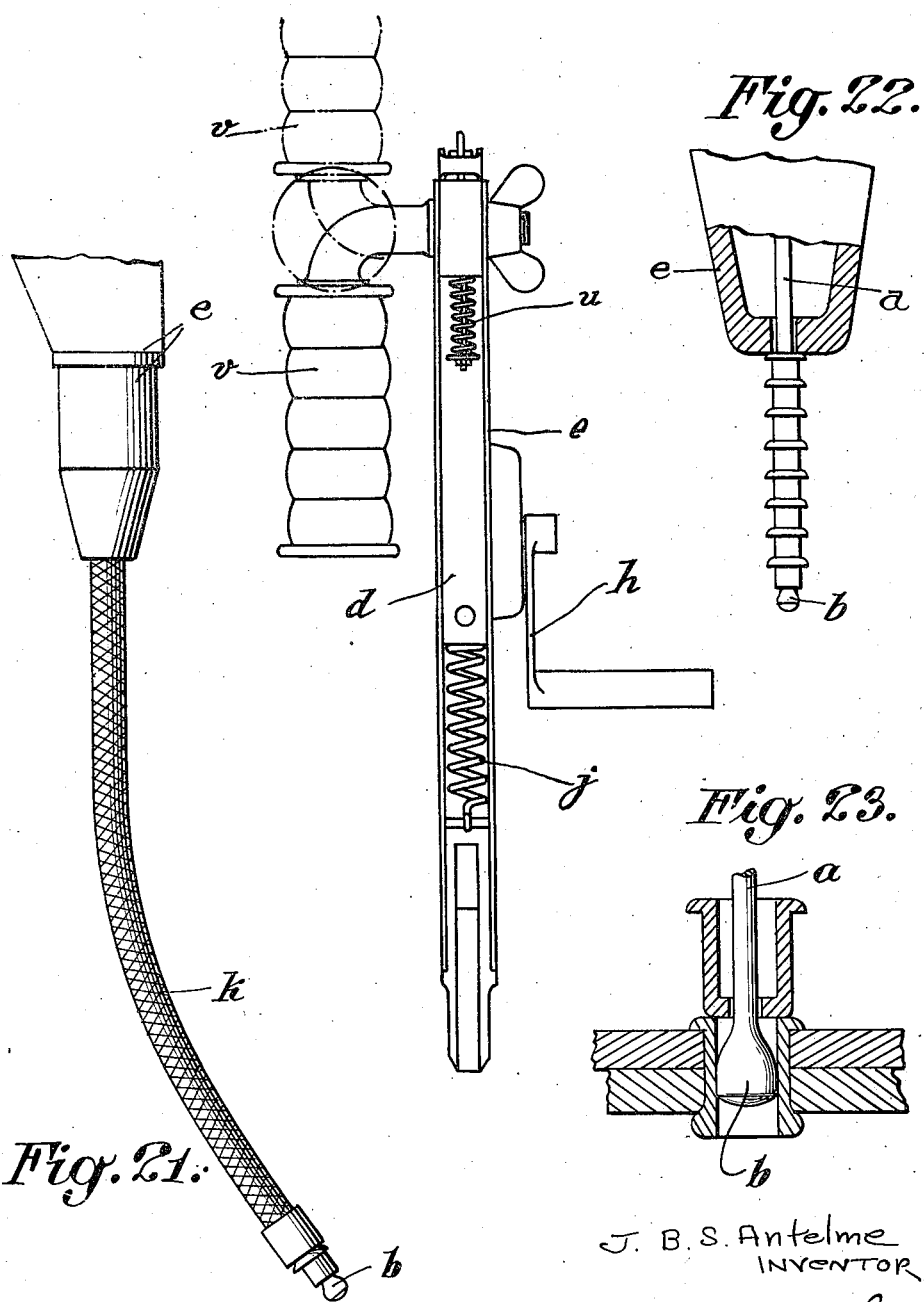

June 11, 1935.  J. B. S. ANTELME  2,004,624
DEVICE FOR SETTING TUBULAR RIVETS
Filed May 11, 1933  4 Sheets-Sheet 3
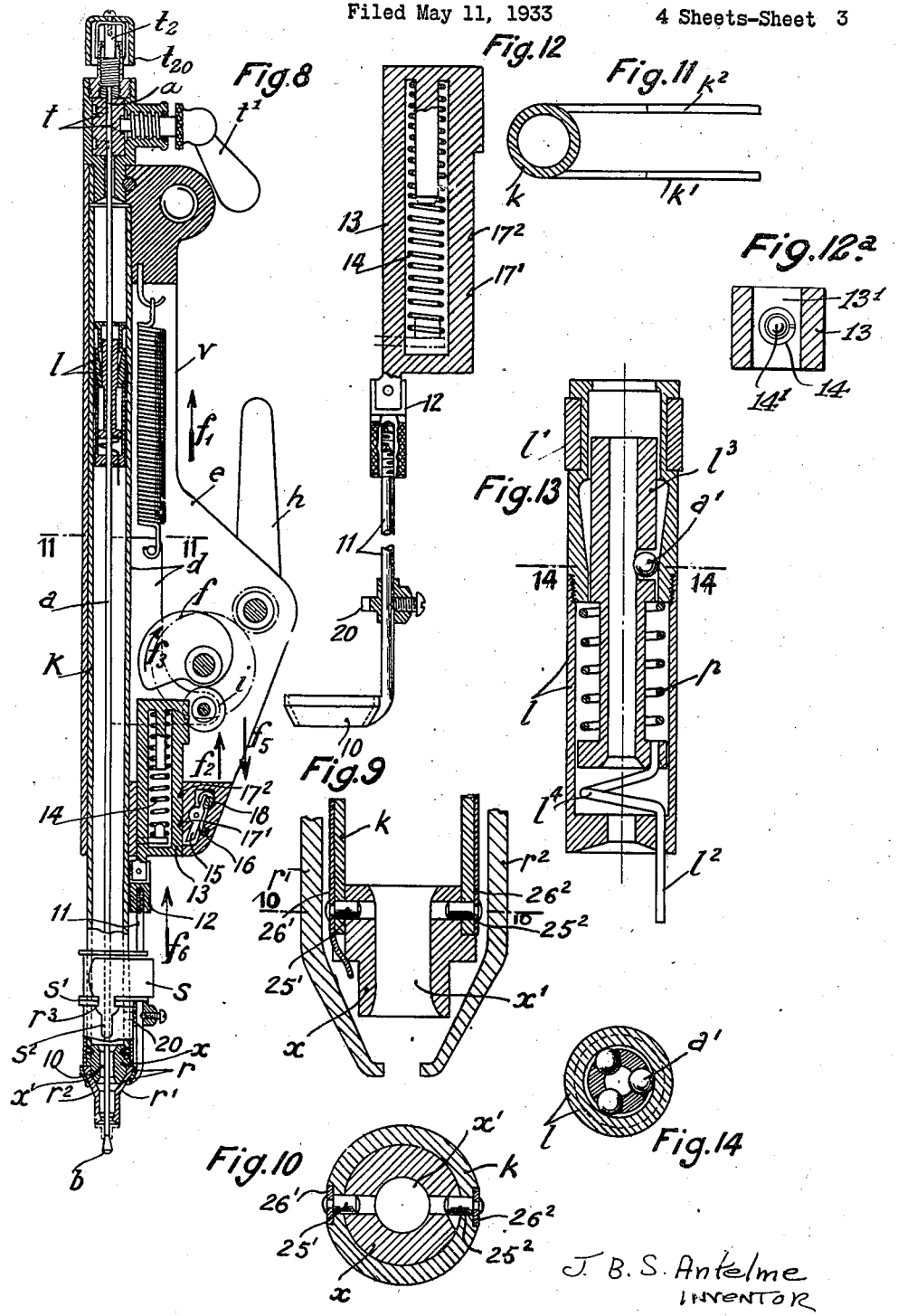
J. B. S. Antelme
INVENTOR
By Marks & Clerk
ATT'YS.

June 11, 1935.  J. B. S. ANTELME  2,004,624
DEVICE FOR SETTING TUBULAR RIVETS
Filed May 11, 1933   4 Sheets-Sheet 4
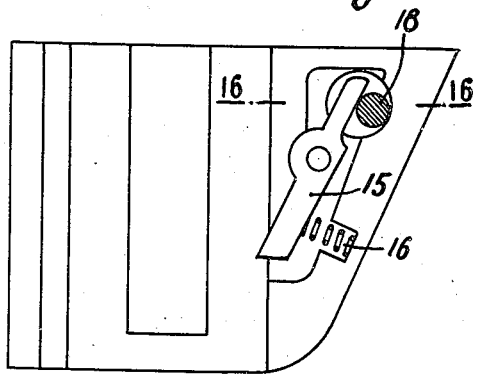
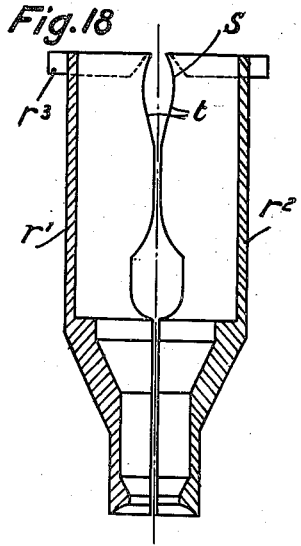
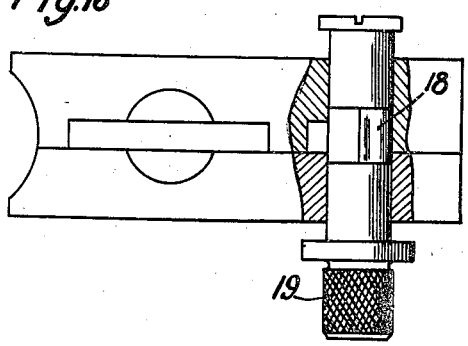
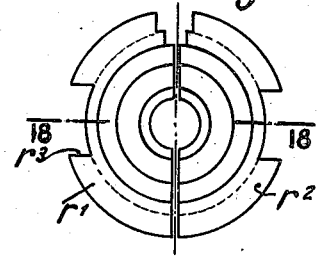
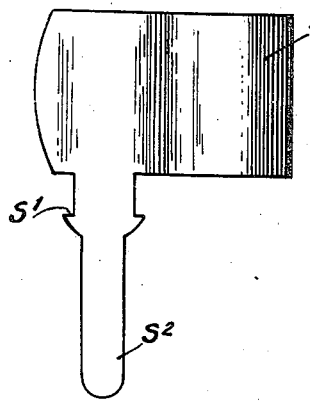
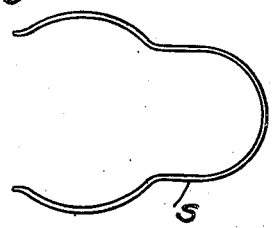
J. B. S. Antelme
INVENTOR
By: Marks & Clerk
ATTYS.

Patented June 11, 1935

2,004,624

UNITED STATES PATENT OFFICE 2,004,624

DEVICE FOR SETTING TUBULAR RIVETS

Jean Baptiste Seïde Antelme, St.-Cloud, France, assignor to Blériot-Aéronautique, Suresnes, France, a company of France Application May 11, 1933, Serial No. 670,595
In Belgium May 11, 1932

22 Claims. (Cl. 218—19)

This invention relates to improvements in devices for setting tubular rivets.

A first object of the invention is to provide means for insuring the connection of two metal members in a quick and sure manner, although the one side of the connection is not accessible.

Another object of the invention is to provide a device through which tubular rivets may be quickly set.

A further object of the invention is to provide a device through which tubular rivets of different diameters may be set.

Still a further object of the invention is to provide means for setting tubular rivets on uneasily accessible surfaces.

Devices through which the above mentioned objects may be attained have the features resulting from the following specification and from the appended claims.

Several devices according to the invention are shown by way of examples in the appended drawings, in which Figures 1 to 4 inclusively are an elevational view, a sectional longitudinal view and a cross sectional view through line 3—3 of Figure 2, and an end view respectively of a device for setting the rivets according to a first embodiment of the invention.

Figures 5 and 6 are respectively an enlarged plane view and two enlarged half sectional views through line 6—6 of Figure 5, separately showing certain elements of the device.

Figure 7 is an enlarged sectional view showing the part of said device lying on the side of the anvil.

Figure 8 is a longitudinal axial sectional view showing another device according to a second embodiment of the invention.

Figure 9 is an enlarged longitudinal view of the end of the anvil.

Figure 10 is a cross sectional view through line 10—10 of Figure 9.

Figure 11 is a cross sectional view through line 11—11 of Figure 8.

Figure 12 is an elevational view and a longitudinal sectional view of the slider controlling the locking ring.

Figure 12a is a cross section of the slider.

Figure 13 is an enlarged longitudinal sectional view of the slider insuring the advancement of the rivet pile.

Figure 14 is a cross sectional view of said slider through line 14—14 of Figure 13.

Figure 15 is an enlarged view of the locking device maintaining the locking ring in its released position.

Figure 16 is a cross sectional view of said locking device through line 16—16 of Figure 15.

Figure 17 is an end view of the jaws of the anvil.

Figure 18 is a longitudinal sectional view through line 18—18 of Figure 17.

Figures 19 and 20 are respectively a side view and a plan view of a jaw retaining spring.

Figure 21 is an elevational view of a particular arrangement of the magazine tube.

Figure 22 is an elevational view of another embodiment of the invention, and

Figure 23 is an enlarged view showing the setting of a rivet by means of the device shown in Figure 22.

The device shown in Figures 1 to 7 inclusively comprises a spindle $a$ the rod of which has a material length and is adapted for receiving a large number of rivets; said spindle $a$ is provided, on its lower end, with an olivelike knob $b$ which, when passing through the rivet, insures the clenching of the inner collar of the rivet, thus setting the latter.

Spindle $a$ is rigidly secured to a carriage $d'$ sliding in the frame of the device through the action of a roller $i$ engaging a cam $f$ having a control crank $h$; the carriage $d$ and its roller $i$ are returned against the cam $f$ by a spring $j$.

Spindle $a$ is secured to the carriage $d$ by means of jaws $t$ forming wedges and acted upon by a spring $u$; the release of said spindle $a$ is facilitated by a releasing lever $u^1$.

Spindle $a$ slides in a magazine tube K secured to the frame $e$.

In the tube $k$ is frictionally mounted feeding means resting upon the pile of rivets on the spindle $a$ and connected to said spindle so that it can be carried with it in the movement of the latter only during the return stroke of the spindle.

The movable member or slider mounted in the tube $k$ comprises a piston $l$ frictionally mounted in said tube. Said piston is provided with an extension $m$ of smaller diameter resting on the rivet pile with its free end.

A movable member formed of a frustoconical ring $n$ carrying wedging balls $n^1$ is received in the piston $l$ which has also an inner surface of frustoconical form.

A spring $p$ rests with one end on the piston $l$ and with the other end on a member $q$ controlled by the movements of the ring $n$; said ring insures, on the one hand, an initial wedging on the beginning of each return stroke of the spindle $a$ and, on the other hand, it has the effect of preventing the piston $l$ from passing out of the tube when all the rivets have been delivered.

The anvil comprises a movable side jaw $r$ pivotally mounted on an axis $r^1$.

The movements of said movable jaw $r$ are insured by the effect of the thrust exerted through the rivet to be delivered during the return movement of the spindle, the jaw $r$ then opening against the action of a spring $s$ through which said jaw $r$ is returned to its closing position when the rivet has been delivered.

The device also comprises a handle $v$ mounted so that it can assume different positions according to the manner in which the device is to be manipulated by the operator (see Figure 4).

In the embodiment according to Figures 8 to 20 inclusively the spindle $a$ is secured, on its upper end, to the casing or frame $e$ of the device by means of the clamp dogs $t$ of a vice integral with or rigidly connected to said frame $e$, while the anvil $r$ is carried by the movable carriage $d$ having a roller $i$ actuated by the cam $f$ with the control crank $h$.

Thus, contrary to the control of the foregoing device, when setting a rivet, the anvil resting on the rivet which is pressed against the surface to be riveted, the whole of the casing or frame $e$ with the spindle $a$ moves along $f^1$ with respect to the anvil $r$, thus permitting the knob of the spindle to pass through the inner collar of the rivet and consequently said inner collar of the rivet is caused to be clenched outwardly.

A set screw $t^2$ forming an abutment for the spindle $a$ and provided with an operating head $t^{20}$ allows of the projection of the knob $b$ being adjusted at will according to the height of the rivets which are used.

The magazine tube K is provided with two flanges $k^1$, $k^2$ (see Figure 11) forming the slider $d$ which carries the roller. The tube K is provided with a ring $x$ on its end, said ring being removably secured for instance by means of pins $25^1$, $25^2$ provided on spring blades $26^1$, $26^2$ secured to the outer surface of the tube K.

Said ring $x$ has an axial bore $x'$ the diameter of which is slightly larger than the outer diameter of the head of the rivets carried by the spindle $a$.

The upper and lower edges of the bore $x^1$ are slightly flared. These flares facilitate the engagement of the pile of rivets on the spindle $a$ with the ring $x$ and prevent the rivets from being held at the entrance of the bore $x^1$.

Thus the ring $x$ insures the guiding of the end of the spindle $a$ carrying the rivets, thus preventing any distortion of said spindle $a$, the diameter of which is very small when the rivets also are of small diameter.

On the other hand the removably secured guiding ring $x$, at the end of the tube K, can be replaced by other rings $x$ having bores $x'$ of different diameters, said bores corresponding to the diameters of the rivets which are used.

Jaws $r^1$, $r^2$ forming the anvil are removably mounted around the tube K and maintained in a close relative position together and with respect to the tube K through a spring $s$ having the form of a pair of tongs (see Figures 19 and 20).

The spring $s$ is provided on the one hand with two hooks $s^1$ adapted to enter notches $r^3$ provided in the jaws $r^1$, $r^2$ and, on the other hand, with tongues $s^2$ resting upon the outer surface of the jaws $r^1$, $r^2$. This arrangement prevents a rising movement of the jaws with respect to the tube K and permits, on the one hand, an opening of the jaws under the thrust of a rivet while opening the tongues $s^2$ of the spring $s$ and, on the other hand, a complete releasing of the spring $s$ when the jaws $r^1$, $r^2$ are to be substituted by other jaws permitting the use of rivets of larger or smaller diameters.

Said jaws $r^1$, $r^2$ forming the anvil and yieldably maintained by the spring $s$ are brought closely together and are held in the closed position by a locking ring 10 having a conical entrance and riding on the conical ends of the jaws $r^1$, $r^2$.

The locking ring 10 (see Figure 12) is carried by a rod 11 adjustably mounted in a cap 12 connected with a slider 13. Said slider 13 moves in the casing or frame $e$ of the device. It is acted upon in the direction $f^2$ by a return spring 14 for engaging the ring 10 with the jaws $r^1$, $r^2$. The lower end of the spring 14 bears against a member $14^1$ integral with the frame $e$ of the apparatus. The supporting member $14^1$ of the spring 14 extends through the slider 13 into a lateral opening $13^1$ (Figure 12a).

For releasing said ring 10 the slider is actuated by the cam $f$ which actuates the carriage $d$ in the manner to be described later on.

The slider 13 can be locked in the position corresponding to the release of the clamping ring 10 by a locking device formed of a spring dog 15 having a spring 16, said dog being adapted to engage notches $17^1$, $17^2$ provided in the surface of the slider 13. The dog 15 is maintained inactive by an eccentric cam 18 having an outer control knob 19 in order to permit the normal working of the device.

The pile of rivets on the rod of the spindle $a$ is pushed towards the delivering end of the magazine K by a slider $l$ frictionally mounted on the spindle $a$; at this end said slider comprises wedging members such as balls $a'$ resting on the surface of the spindle $a$ under the action of a spring $p$; on the other hand a segment $l^1$ is mounted on the upper part of the slider $l$ and rests on the inner surface of the magazine tube K.

A rod $l^2$ is integral with the movable member $l^3$ of the slider $l$ through the medium of a yieldable member $l^4$, (Figure 13). The said rod $l^2$ clamped in the lower part of the movable member $l^3$ extends through the lower wall of the slider $l$ and projects to the exterior thereof.

When the last rivet has passed out of the magazine, the slider $l$ reaches the end of its stroke and the rod $l^2$ which is connected to the movable ball carrying member $l^3$ and which projects outside the slider $l$ comes in contact with the removable ring $x$ secured to the end of the tube $k$. If, at this moment, the spindle $a$ is pulled in order to draw it out, the slider $l$ which is arrested by the spindle $a$ is displaced downward by compressing the yieldable member $l^4$ of the rod $l^2$; if the spindle $a$ is then released, the slider $l$ being rendered immovable by the segment $l^1$ in the tube $k$ the movable ball carrying member $l^3$ is displaced upward by means of the yieldable member $l^4$. The balls $a^1$ no longer press against the spindle $a$ which is thus released (Figure 13).

The operation of the above described device is as follows:

Supposing that a rivet is brought into the setting position, as shown in Figure 1, when turning the handle $h$ the cam $f$ moves along $f^3$, thus pushing the roller $i$; therefore, the carriage $d$ tends to move along $f^5$, but as above mentioned the whole frame d with the spindle f moves upwardly along f⁶, so that the rivet remains pushed outwardly by the knob b.

During this movement the spindle a slides with respect to the slider l carried within the movement of the segment l¹ which connects it rigidly with the magazine tube K.

On the other hand, the jaws r¹, r² of the anvil are maintained locked by the clamping ring 10 on which the return spring 14 pulls. When the knob has passed through the inner collar of the rivet during this movement, the rivet is set.

The slider l which is carried with it in the movement of the magazine tube K further pushes the rivet pile until the first rivet engages the knob of the spindle. The feeding movement of the segment l being then smaller than the resistance offered by the knob, the slider stops its movement and rests on the rivet pile, while the magazine tube K slides on the slider l, which remains unmovable.

At this moment the spindle and the rivets are enclosed between the jaws r¹ and r².

Then the cam f abruptly releases the roller i so that the slider d returns to its initial position, but the slider 13 which carries the locking ring acted upon by its return spring 14 is arrested in its movement by the nose of the cam f, so that the jaws r¹, r² are released at their ends; under the action of the shifter 20 mounted on the control rod for the locking ring said jaws r¹, r² can separate from another in order to permit another rivet to pass through, which has been automatically advanced by the rivet pile in the above explained manner.

To this end the shifting pin 20 which controls the opening of the jaws r¹, r² enters the opening s (Figure 18) provided in the lower part of the jaws r¹, r²; it opens said jaws when running upwardly on the rise t.

When further rotating, the cam f releases the slider 13 which under the action of its return spring 14 brings it to its initial position in which the ring 10 clamps the end of the jaws r¹, r² anew.

In order to effect the disassembling of the device by taking the spindle a out of the same, it is sufficient to arrest the locking ring 10 in its position when released from the jaws r¹, r²; to this end the control knob 19 of the eccentric cam 18 is turned so that the dog 15 may enter the notch 17¹, and then the notch 17² when it is desired completely to free the jaws r¹, r² in order to replace them by other jaws which are larger or smaller.

Figure 21 relates to an embodiment which is not provided with a magazine tube but with a flexible tube k¹ terminated by an anvil r². A flexible rod fixed and actuated like the rod a of the device of Figure 8 extends into the flexible tube k¹ and is terminated by a knob b¹. In this case, the rivets must be placed one by one on the flexible tube, the rod being introduced in the flexible tube k¹ and then fixed on the sliding member of the apparatus by means of the device of Figure 8.

In the embodiment shown in Figures 22 and 23 the rivet pile is arranged inwardly of the frame of the device so that said rivet pile itself forms the anvil on which the first rivet to be set rests. In this case the spindle a moves progressively towards the inner part of the frame of the device in order to successively set the rivets after another until all the rivets have been used.

I claim:

1. In an apparatus for the setting of tubular rivets with an inner collar, a supporting frame, a magazine tube fixedly mounted on the said supporting frame, a spindle disposed in the magazine tube and movable with respect to the said magazine tube, said spindle comprising on the one hand a rod on which a plurality of rivets are previously engaged in the order in which they are to be set and on the other hand a head on which the first rivet to be set rests, actuating members carried by the said frame for actuating the spindle which slides in the first rivet to be set, the head of the spindle outwardly clenching the inner collar of said rivet for the setting of the latter, and means for supporting and bringing into setting position the rivet engaged on the rod above the first rivet.

2. In an apparatus for the setting of tubular rivets with an inner collar; a supporting frame; a magazine tube fixedly mounted on the said supporting frame; a sliding carriage movable on the said supporting frame; a spindle disposed in the magazine tube and secured to the sliding carriage; the said spindle comprising on the one hand a rod on which a plurality of rivets are previously engaged and, on the other hand, a head on which the first rivet to be set rests; actuating members carried by the frame and controlling the sliding carriage so that the spindle slides in the first rivet to be set, the head of the spindle outwardly clenching the inner collar of said rivet for the setting of the latter and means for supporting and bringing into setting position the rivet engaged on the rod above the first rivet.

3. In an apparatus for the setting of tubular rivets with an inner collar: a supporting frame; a magazine tube fixedly mounted on the said supporting frame; a sliding carriage movable on the said supporting frame; returning means acting on the sliding carriage and tending to return it to its inactive position; a spindle disposed in the magazine tube and secured to the sliding carriage; the said spindle comprising on the one hand a rod on which a plurality of rivets are previously engaged and, on the other hand, a head on which the first rivet to be set rests; a rotating cam mounted on the frame and engaging with the sliding carriage for displacing the same in the direction of the tension of its returning member so that the spindle slides in the first rivet to be set, the head of the spindle outwardly clenching the inner collar of said rivet for the setting of the latter.

4. In a device for setting tubular rivets with an inner collar: a supporting frame, a spindle mounted movably with respect to said frame, said spindle comprising on the one hand a rod on which a plurality of rivets are previously engaged and, on the other hand, a head on which the first rivet to be set rests; actuating means carried by the frame for actuating the spindle which slides in the first rivet to be set, the head of the spindle outwardly clenching the inner collar of said rivet for the setting of the same, a feeding member mounted about the rod of the spindle and resting on the rivet pile and acting to push the rivets towards the head of the spindle.

5. In a device for setting tubular rivets with an inner collar: a supporting frame, a magazine tube mounted on said frame, a spindle mounted in the magazine tube and movable with respect to said magazine tube, said spindle comprising on the one hand a rod on which a plurality of rivets are previously engaged and, on the other hand, a head on which the first rivet to be set rests; actuating means carried by the frame for actuating the spindle which slides in the first rivet to be set, the head of the spindle outwardly clenching the inner collar of said rivet for the setting of the same, a feeding member mounted about the rod of the spindle, and in the magazine, said feeding member acting to push the pile of rivets towards the head of the spindle.

6. In a device for setting tubular rivets with an inner collar: a supporting frame, a magazine tube mounted on said frame, a spindle mounted in the magazine tube and movable with respect to said magazine tube, said spindle comprising on the one hand a rod on which a plurality of rivets are previously engaged and, on the other hand, a head on which the first rivet to be set rests; actuating means carried by the frame for actuating the spindle which slides in the first rivet to be set, the head of the spindle outwardly clenching the inner collar of said rivet for the setting of the same; a hollow piston freely sliding on the rod of the spindle and resting on the pile of rivets; wedging members movably mounted in the said hollow piston, said members causing the hollow piston to slide on the inner wall of the magazine tube in the direction of the feed motion of the rivets and the said wedging members being released when the direction of movement of the spindle is opposite to the direction of the feed motion of the rivets.

7. In an apparatus for the setting of tubular rivets with an inner collar; a supporting frame; an extensible anvil mounted on the said supporting frame; a magazine tube fixedly mounted on the said supporting frame; a sliding carriage movable on the said supporting frame; a spindle disposed in the magazine tube and secured to the sliding carriage, the said spindle comprising on the one hand a rod on which a plurality of rivets are previously engaged and, on the other hand, a head projecting from the extensible anvil, the first rivet to be set resting on the head of the spindle and being maintained by the anvil; actuating means carried by the frame and actuating the spindle which slides in the first rivet to be set, the head of the spindle outwardly clenching the inner collar of said rivet for the setting of the latter and means for supporting and bringing into setting position the rivet engaged on the rod above the first rivet.

8. In a device for setting tubular rivets with an inner collar: a supporting frame, a spindle carried by said frame, said spindle comprising on the one hand a rod on which a plurality of rivets are previously engaged and, on the other hand, a head on which the first rivet to be set rests, a movable carriage sliding on the supporting frame, an extensible anvil carried by said sliding carriage, said anvil sliding on the end of the spindle and maintaining the first rivet to be set; actuating means carried by the frame for actuating the sliding carriage so that the spindle slides in the first rivet to be set, the head of the spindle outwardly clenching the inner collar of said rivet for the setting of the same.

9. In a device for setting tubular rivets with an inner collar: a supporting frame, a movable carriage slidably mounted on said frame, a magazine tube carried by said sliding carriage, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same.

10. In a device for setting tubular rivets with an inner collar: a supporting frame, a movable carriage slidably mounted on said frame, a magazine tube carried by said sliding carriage, a guiding ring mounted at the end of the magazine tube, a spindle carried by the frame and mounted in the magazine tube, said spindle comprising on the one hand a rod on which a plurality of rivets are previously engaged and, on the other hand, a head on which the first rivet to be set rests, the rivets being outwardly guided by the guiding ring, and actuating means carried by the frame for controlling the sliding frame so that the spindle slides in the first rivet to be set, the head of the spindle outwardly clenching the inner collar of said rivet for the setting of the same.

11. In a device for setting tubular rivets with an inner collar: a supporting frame, a movable carriage slidably mounted on said frame, a magazine tube carried by said sliding carriage, a guiding ring with an opening corresponding to the diameter of the rivets which are used and movably mounted on the end of the magazine tube, a spindle carried by the frame and mounted in the magazine tube, said spindle comprising on the one hand a rod on which a plurality of rivets are previously engaged and, on the other hand, a head on which the first rivet to be set rests, the rivets being outwardly guided by the guiding ring and actuating means carried by the frame for controlling the sliding carriage so that the spindle slides in the first rivet to be set, the head of the spindle outwardly clenching the inner collar of said rivet for the setting of the same.

12. In an apparatus for the setting of tubular rivets with an inner collar, a supporting frame, a magazine tube fixedly mounted on the said supporting frame, an extensible anvil removably mounted on said frame and provided with a facing corresponding to the rivets which are used, a spindle disposed in the magazine tube and movable with respect to the said magazine tube, said spindle comprising on the one hand a rod on which a plurality of rivets are previously engaged in the order in which they are to be set and on the other hand a head projecting from the extensible anvil, the first rivet to be set resting on the head of the spindle and maintained by the anvil, actuating means carried by the frame for actuating the spindle which slides in the first rivet to be set, the head of the spindle outwardly clenching the inner collar of said rivet for the setting of the same, and means for supporting and bringing into setting position the rivet engaged on the rod above the first rivet.

13. In a device for setting tubular rivets with an inner collar: a supporting frame, a movable carriage slidably mounted on said frame, a magazine tube carried by said sliding carriage, an anvil removably mounted on the end of the magazine tube, said anvil being formed of two jaws attached to the end of the magazine tube, a yieldable member resting on the jaws, a spindle carried by the frame and mounted in the magazine tube, said spindle comprising on the one hand a rod on which a plurality of rivets are previously engaged and, on the other hand, a head on which the first rivet to be set rests, and actuating means carried by the frame for controlling the sliding carriage so that the spindle slides in the first rivet to be set, the head of the spindle outwardly clenching the inner collar of said rivet for the setting of the same.

14. In a device for setting tubular rivets with an inner collar: a supporting frame, a movable carriage slidably mounted on said frame, a magazine tube carried by said sliding carriage, an anvil removably mounted on the end of the magazine tube, said anvil being formed of two jaws attached to the end of the magazine tube, a yielding member resting on said jaws, a spindle carried by the frame and mounted in the magazine tube, said spindle comprising on the one hand a rod on which a plurality of rivets are previously engaged and, on the other hand, a head on which the first rivet to be set rests, actuating means carried by the frame for controlling the sliding carriage so that the spindle slides in the first rivet to be set, the head of the spindle outwardly clenching the inner collar of said rivet for the setting of the same, and an opening member mounted on the frame and adapted to engage the jaws of the anvil for opening the same.

15. In a device for setting tubular rivets with an inner collar: a supporting frame, a movable carriage slidably mounted on said frame, a magazine tube mounted on said sliding carriage, an anvil removably mounted on the end of the magazine tube, said anvil being formed of two jaws attached on the end of the magazine tube, a yieldable member resting on the jaws, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same, and a locking ring slidably mounted on the frame for clamping the jaws in their working position.

16. In a device for setting tubular rivets with an inner collar: a supporting frame, a movable carriage slidably mounted on said frame, a magazine tube carried by said sliding carriage, an anvil removably mounted on the end of the magazine tube, said anvil being formed of two jaws secured to the end of the magazine tube, a yielding member resting on said jaws, a spindle carried by the frame and mounted in the magazine tube, said spindle comprising on the one hand a rod on which a plurality of rivets are previously engaged and, on the other hand, a head on which the first rivet to be set rests, actuating means carried by the frame for controlling the sliding carriage so that the spindle slides in the first rivet to be set, the head of the spindle outwardly clenching the inner collar of said rivet for the setting of the same, a slider movably mounted on the frame, a locking ring carried by said slider for clamping the jaws in their working position, returning means for moving said slider for locking the jaws, and a movable stop for controlling the return movement of the slider in order to release the locking ring for the jaws.

17. In a device for setting tubular rivets with an inner collar: a supporting frame, a movable carriage slidably mounted on said frame, a magazine tube carried by said sliding carriage, an anvil removably mounted on the end of the magazine tube, said anvil being formed of two jaws attached on the end of the magazine tube, a yieldable member resting on said jaws, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same, a slider slidably mounted on the frame, a locking ring carried by said slider for clamping the jaws in their working position, returning means for moving said slider for locking the jaws, and a movable stop actuated by the actuating means of the sliding carriage for controlling the returning movement of the slider for releasing the locking ring for the jaws.

18. In a device for setting tubular rivets with an inner collar: a supporting frame, a movable carriage slidably mounted on said frame, a magazine tube carried by said sliding carriage, an anvil removably mounted on the end of the magazine tube, said anvil being formed of two jaws attached on the end of the magazine tube, a yielding member resting on said jaws, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same, a slider movable on the frame, a locking ring carried by said slider for clamping the jaws in their working position; returning means for moving said slider for locking the jaws, a movable stop for controlling the returning movement of the slider for releasing the locking ring for the jaws, and a locking device mounted on the frame adapted to prevent the slider from returning to its inactive position, while keeping the locking ring released from the jaws.

19. In a device for setting tubular rivets with an inner collar: a supporting frame, a movable carriage slidably mounted on said frame, a magazine tube carried by said sliding carriage, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same, a hollow piston frictionally slidably mounted in the magazine tube and freely sliding on the rod of the spindle, said piston resting on the pile of rivets, and wedging members movably mounted in the said hollow piston, said members causing the hollow piston to slide on the inner wall of the magazine tube in the direction of the feed motion of the rivets and the said wedging members being released when the direction of movement of the spindle is opposite to the direction of the feed motion of the rivets.

20. In a device for setting tubular rivets with an inner collar: a supporting frame, a movable carriage slidably mounted on said frame, a magazine tube carried by said sliding carriage, a spindle carried by the frame and mounted in the magazine tube, said spindle comprising on the one hand a rod on which a plurality of rivets are previously engaged and, on the other hand, a head on which the first rivet to be set rests; actuating means carried by the frame for controlling the sliding carriage so that the spindle slides in the first rivet to be set, the head of the spindle outwardly clenching the inner collar of said rivet for the setting of the same; a hollow piston frictionally sliding in the magazine tube and freely sliding on the spindle rod, said piston resting on the pile of rivets; wedging members mounted in said hollow piston for thrusting it against the spindle rod when the magazine tube moves in the return direction, and a yieldable stop member carried by the hollow piston and rigidly connected with said wedging members, said stop member being adapted to release the spindle from the wedging members when all the rivets have been used.

21. In a device for setting tubular rivets with an inner collar: a supporting frame, a flexible magazine tube mounted on said frame, a flexible spindle mounted in the flexible magazine tube and movable with respect to said magazine tube, said spindle comprising on the one hand a rod and, on the other hand, a head on which the rivet to be set rests, actuating means carried by the frame for actuating the spindle which slides in the rivet to be set, the head of the spindle outwardly clenching the inner collar of the rivet for the setting of the same.

22. In a device for setting tubular rivets having an inner collar: a supporting frame, a spindle adjustably mounted relatively to said frame, said spindle comprising on the one hand a rod on which a plurality of rivets are previously engaged and, on the other hand, a head on which the first rivet to be set rests, while the last rivet engaged on the rod bears against the frame, actuating means carried by the frame for actuating the spindle so that said spindle successively slides in the rivets as they are set, the head of the spindle outwardly clenching the inner collar of the rivet for setting the same.

JEAN BAPTISTE SEÏDE ANTELME.